(12) United States Patent
Høj

(10) Patent No.: US 9,541,090 B2
(45) Date of Patent: Jan. 10, 2017

(54) HEAT CIRCULATION PUMP

(75) Inventor: Finn Mathiesen Høj, Aarhuis N (DK)

(73) Assignee: GRUNDFOS MANAGEMENT A/S, Bjerringbro (DK)

( * ) Notice: Subject to any disclaimer, the term of this patent is extended or adjusted under 35 U.S.C. 154(b) by 309 days.

(21) Appl. No.: 14/004,528

(22) PCT Filed: Feb. 24, 2012

(86) PCT No.: PCT/EP2012/053223
§ 371 (c)(1),
(2), (4) Date: Sep. 11, 2013

(87) PCT Pub. No.: WO2012/123238
PCT Pub. Date: Sep. 20, 2012

(65) Prior Publication Data
US 2014/0003976 A1    Jan. 2, 2014

(30) Foreign Application Priority Data
Mar. 12, 2011   (EP) ..................... 11002070

(51) Int. Cl.
*F04D 13/06*        (2006.01)
*F04D 29/02*        (2006.01)
(Continued)

(52) U.S. Cl.
CPC ......... *F04D 13/0686* (2013.01); *F04D 13/064* (2013.01); *F04D 29/026* (2013.01); *F04D 29/426* (2013.01); *H02K 5/128* (2013.01); *H02K 5/225* (2013.01); *H02K 7/14* (2013.01); *H02K 11/33* (2016.01); *F05D 2230/60* (2013.01)

(58) Field of Classification Search
CPC ..................................................... F04D 29/426
See application file for complete search history.

(56) References Cited

U.S. PATENT DOCUMENTS 4,103,197 A *   7/1978   Ikegami et al. ............... 310/267
7,036,892 B2 *  5/2006   Suzuki .................... F04C 2/102
                                                      303/116.4

(Continued)

FOREIGN PATENT DOCUMENTS

DE              44 18 166 A1    11/1995
DE        10 2004 030 721 B3    10/2005
(Continued)

*Primary Examiner* — Charles Freay
*Assistant Examiner* — Thomas Cash
(74) *Attorney, Agent, or Firm* — McGlew and Tuttle, P.C.

(57) ABSTRACT

A heat circulation pump includes a pump housing (1) with a pump impeller arranged therein which is arranged in a motor housing (8) which is axially flange-mounted on the pump housing (1). The heat circulation pump also includes a terminal box (12) which is axially connected to the motor housing (8) in order to house electric and/or electronic components of the engine control and for electrically connecting the motor. The terminal box (12) protrudes, radially at least in sections, from the terminal box side end of the motor housing (8) and the terminal box has, in the axial direction, a right-angled outer contour with recesses (20) in the corner areas which are arranged in the axial extension of the screws (11). The flange (10) of the motor housing (8) are fixed to the pump housing (1) by the screws.

20 Claims, 7 Drawing Sheets

(51) Int. Cl.
*F04D 29/42* (2006.01)
*H02K 5/12* (2006.01)
*H02K 5/128* (2006.01)
*H02K 5/22* (2006.01)
*H02K 7/14* (2006.01)

(56) References Cited

U.S. PATENT DOCUMENTS

| | | | | |
|---|---|---|---|---|
| 7,045,922 B2 * | 5/2006 | Marioni | ................ | F04D 29/426 310/261.1 |
| 2010/0090635 A1 * | 4/2010 | Andersen | .............. | F04D 29/426 318/490 |
| 2013/0294949 A1 * | 11/2013 | Blaser et al. | .............. | 417/410.1 |

FOREIGN PATENT DOCUMENTS

| DE | 10 2007 022 070 A1 | 11/2008 | | |
|---|---|---|---|---|
| DK | EP 2072828 A1 * | 6/2009 | ........... | F04D 29/588 |
| EP | 1 204 194 A1 | 5/2002 | | |
| EP | 1 437 819 A1 | 7/2004 | | |

* cited by examiner

HEAT CIRCULATION PUMP

CROSS REFERENCE TO RELATED APPLICATIONS

This application is a U.S. National Phase Application of International Application PCT/EP2012/053223 filed Feb. 24, 2012, and claims the benefit of priority under 35 U.S.C. §119 of European Patent Application EP 11002070.8 filed Mar. 12, 2011, the entire contents of which are incorporated herein by reference.

FIELD OF THE INVENTION

The invention relates to a heating circulation pump with a pump housing with a pump impeller arranged in the pump housing and which is driven by an electric motor arranged in a motor housing axially flanged onto the pump housing, with a terminal box which connects axially onto the motor housing, for receiving electrical and/or electronic components for the motor control and for the electrical connection of the motor.

BACKGROUND OF THE INVENTION

Such heating circulation pumps are counted as belonging to the state of the art. They typically comprise a pump housing with a suction connection and a pressure connection as well as a pump impeller arranged therein. An electric motor is provided for the drive of the pump impeller, whose shaft carries the pump impeller. The stator surrounding the rotor is arranged in a housing which on its side facing the pump housing comprises a flange or similar connection element, via which the motor housing, in particular the stator housing, is connected to the pump housing. A terminal box is provided for the electric connection of the motor and is arranged on the axial side of the stator housing which is away from the pump housing. The terminal box typically also comprises the motor electronics, thus for example a frequency converter. A heating pump of the previously mentioned type is typically known from DE 10 2004 030 721 B3.

SUMMARY OF THE INVENTION

Such heating circulation pumps of smaller and medium construction type are manufactured on a large scale, which is why even the smallest of improvements could already lead to a large saving with the manufacture and/or assembly. One constantly strives to improve these pumps on the one hand with regard to technology and to design them such that they are more reliable, and on the other hand to lower the manufacturing and assembly costs.

The heating circulation pump according to the invention comprises a pump housing with a pump impeller arranged therein, which is driven by an electric motor arranged in a motor housing flanged axially onto the pump housing. A terminal box for receiving electrical and/or electronic components for the motor control and for the electrical connection of the motor connects axially to the motor housing. According to the invention, the terminal box is designed such that at least in sections, it projects radially beyond the end of the motor housing, said being on the terminal box side, and has an outer contour which is essentially rectangular in the axial direction, with recesses in the corner regions which are arranged in the axial extension of screws, with which the flange of the motor housing is fastened on the pump housing.

The basic concept of the solution according to the invention is to design the terminal box such that it projects radially beyond the motor housing, which is typically circular in the connection region, and specifically into an essentially rectangular outer contour, wherein the corner regions are recessed, since these region lie flush with the screws, with which the flange of the motor housing is fastened on the pump housing. These recesses ensure that the screw heads are accessible with a tool which is led in the axial direction of the screws, from the terminal box, thus for example a screwdriver or a key for a hexagon socket. The terminal box thus is widened in a targeted manner in the regions which are mostly not usable in any case and which typically lie within the radial outer contour of the pump housing.

Advantageously, the terminal box in its region projecting radially beyond the motor housing comprises fastening means, with which the terminal box is fastened on the motor housing. This arrangement is particularly favorable, since then no fastening means engage on the end of the motor housing which is on the terminal box side, as well as on the periphery of the circular part of the motor housing, but advantageously not until in the flange region of the motor housing. With cast housings, this arrangement is particularly favorable with regard to tooling technology and is thus advantageous with regard to manufacturing technology.

Advantageously, the fastening means are formed by snap connections which at least partly engage over the motor housing in a radial and axial manner. Such snap connections have the advantage that the terminal box can be assembled on the motor housing without tools.

In order to permit an axial engaging-over or lapping, recesses are provided in the flange region of the motor housing, into which advantageously snap projections which are arranged on tongues engage, said tongues extending from the radially protruding parts of the terminal box in the axial direction along the motor housing and being integrally formed on the terminal box. Advantageously, these tongues are integrally formed on the sides of the terminal box, on which also contact feed-throughs, specifically to the motor on the one hand and for the electric plug connection on the other hand, are provided. These tongue-like projections can be designed as one piece with the base body of the terminal box, and not only hold the terminal box on the flange of the motor housing in a fixed manner, but moreover also secure the electrical connection between the terminal box contacts and the motor.

Advantageously, the arrangement is effected such that the contacts to the motor winding on the one hand, and the contacts for the electric connection on the other hand, are arranged on two oppositely lying sides in the edge region of the terminal box, and that the terminal box on at least one side which is offset by 90° to the oppositely lying sides, in which the contacts are arranged, at least radially projects further beyond the motor housing, than at the oppositely lying sides at which the contacts are led out. By way of this arrangement, advantageously with a usual upright assembly of the pump, i.e. with which the suction connection and pressure connection lie arranged essentially vertical above one another and the rotation axis of the rotor is arranged perpendicularly thereto, i.e. horizontally, the electrical connection plug or the electric connection socket of an electric plug connection can lie in a lateral manner, i.e. to the right or to the left of the motor or terminal box in the installed position, whereas the radially protruding region or regions lie at the top or bottom, thus where guiding of the leads of the pump runs, and a free space on the motor side or on the terminal box side exists, which cannot be used anyway. This is because the regions of the suction connection and pressure connection, in particular with compact heating installations, in which such pumps are likewise integrated, must be accessible from the front, i.e. in the direction of the rotation axis of the pump or parallel thereto, in order to be able to exchange the pump.

Such an arrangement is also particularly advantageous if different terminal boxes are to be available for the same motor type, for example a terminal box with a pulse width control for the motor, a terminal box with an integrated frequency converter and a terminal box with extensive electronics. Then, the different construction volumes can be formed by way of a suitably wide or less wide, radial protrusion of these regions which are offset by 90° to the electric connections, wherein the electrical connections to the motor as well as to the plug can be retained in an unchanged manner. This is also advantageous with regard to tooling technology, since the respectively differently designed terminal boxes can be manufactured with one and the same tool, if this tool is designed in a suitable manner.

The contacts which are led through the terminal box wall are advantageously cast in, and end within the terminal box on a circuit board. This arrangement on the one hand is favourable with regard to manufacturing technology, since the contacts when injection moulding are integrated into the terminal box wall in a fixed and sealed manner, so that one the one hand a mechanically stable and on the other hand a fluid-tight connection arises, which is particularly advantageous if the terminal box is to be designed in a closed manner, in order to protect the electric and electronic components located therein, from moisture in a reliable manner. Thereby, on the one hand contacts from the terminal box to the motor winding are provided, which ensure the electrical connection of the motor winding, and on the other hand contacts which are led to the outside from the inside of the terminal box by way of plug or socket of an electrical plug connection and which form the electrical connection of the heating circulation pump. Such a plug, or such a socket, which usefully forms part of the terminal box housing, thus formed as one piece, as a plastic injection molded part at least with a part of the terminal box, is advantageously arranged such that it is arranged axially offset to the terminal box and adjacent to the motor housing. It is then ensured that the plug connection is arranged next to the heating circulation pump, thus that this does not project beyond this in the axial direction.

If the motor is a wet-running motor, as is usual with heating circulation pumps, then according to a further development, it is advantageous to arrange the terminal box base distanced to the motor housing and preferably to design it in a closed manner. By way of this, on the one hand, a thermal separation between the motor housing and the terminal box is ensured, and on the other hand, the penetration of delivery fluid into the terminal box, as can be the case e.g. if the motor-side plug for the access to the shaft end exhibits leakages, is reliably prevented. Given a blocked motor, in order to retain the possibility of getting to the free shaft end of the motor from the side which is away from the pump, despite the terminal box connecting axially onto the housing, it is useful if the terminal box has an axial, central feed-through to the rotor space, said feed-through being accessible form the outside. It is to be understood that this feed-through is designed in a sealed manner with respect to the inside of the terminal box. Typically, an annular structure of the terminal box results due to this.

Advantageously, a three-phase D.C. motor with six winding is applied as a motor. Such permanent magnet motors are highly effective and can be activated at practically any speed by way of a frequency converter. The frequency converter is advantageously arranged in the terminal box.

Six windings is not only advantageous with respect to the efficiency of the motor, but also with regard to their arrangement, since then the motor housing can be designed with a circular basic contour in the axial direction, in the region between the motor flange and the terminal box, which leads to smaller dimensions of the motor and thus creates the necessary free space for the terminal box and the electronics located therein.

The invention is hereinafter explained in more detail by way of embodiment examples represented in the drawing. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
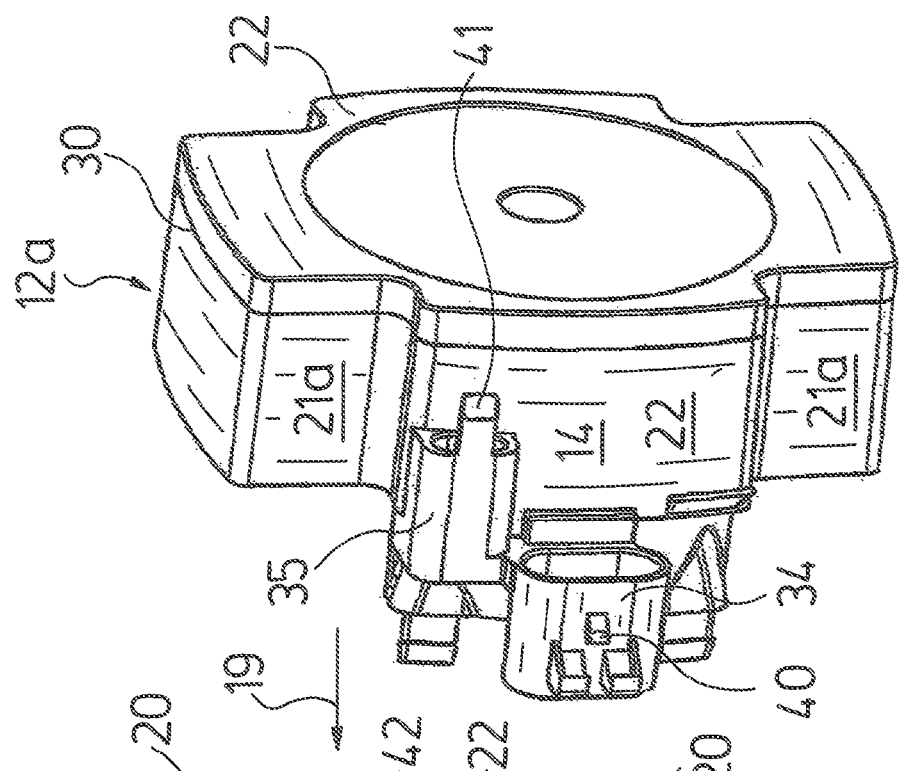
FIG. 1 is a simplified perspective representation showing a heating circulation pump according to the invention.

Referring to the drawings in particular, the heating circulation pump represented by way of FIGS. 1 and 3 to 8 comprises a centrifugal pump with a pump housing 1 with a suction connection 2 and a pressure connection 3 with a channel layout which is formed therebetween and which leads the fluid coning from the suction connection 2 to a suction port 4 of pump impeller 5 which is mounted within the pump housing 1 and whose driven side connects to a channel leading to the pressure connection 3.

The heating circulation pump moreover comprises a motor, here a wet-running motor, whose rotor 6 runs in a can 7 which is filled with fluid. The can 7 is surrounded by a stator, i.e. by the motor windings arranged on the peripheral side around the can 7, as well as by a motor housing 8 which accommodates the stator. The rotor 6 comprises a central shaft 9 which extends to into the pump housing 1 and carries the pump impeller 5, so that the rotation movement of the rotor 6 is transmitted onto the pump impeller 5.

The motor housing 8 at its side which faces the pump housing 1 comprises a flange 10, with which it is connected to the pump housing 1, and via four screws 11 in the corner regions of the flange, is connected to the pump housing 1 in a sealed and fixed manner. In the represented embodiment, the pump housing 1 and the motor housing 8 consist of metal and are manufactured as cast parts.

With the heating circulation pumps represented here, the motor housing 8 is designed as metallic cast housing. For the present invention however, the housing can also be formed by a cast stator, as is then the case if the stator winding is cast into plastic. The motor housing can also be designed as a plastic injection molded part. It is to be understood that the earth contact which is described in detail further below is then integrated within the plastic and is connected to the stator iron core and the then metallically designed can of the motor, in an electrically conductive manner.

The heating circulation pump furthermore comprises a terminal box 12 which consists of plastic, is attached on the axial side of the motor housing 8, said side being away from the pump housing 1, and engages over the motor housing 8 in a complete manner to its axial side and in a partial manner radially, i.e. on the peripheral side.

The spatial descriptions axial and radial which have been cited above and are cited hereinafter relate to the rotation axis 13 of the rotor 6 or of the pump impeller 5. The axial sides are thus the sides which run essentially perpendicularly to the rotation axis 13, whereas radial surfaces are the surfaces which extend parallel to the rotation axis.

The motor housing 8 in the flange region has a rounded, essentially square cross section, whereas the remaining part of the motor housing 8, thus the part connecting to the terminal box 12 has an essentially circular cross section and therefore has a peripheral surface which has the shape of a cylinder surface. Whereas the pump housing 1 and the motor housing 8 are releasably connected to one another by way of four screws 11, the terminal box 12 which consists of plastic is fastened on the motor housing 1 by way of snap connections. For this, the terminal box 12 comprises four tongues 15 which extend out of the side walls 14 of the terminal box towards the pump housing 1 and at whose end snap connections 16 are laterally arranged, wherein these snap projections engage behind snap recesses 17 in the motor housing 8 which are integrally formed on the motor housing 8 in the region of the flange 10. These snap recesses 17 are formed in each case by a step in a tubular guide 18 on the motor housing 8 (see FIG. 8), said guide being directed from the flange 10 to the terminal box 12.

When placing the terminal box 12 onto the motor housing 8 in the axis direction, thus in the push-on direction 19, the tongues 15 get into the guides 18 which are arranged flush with these, wherein the snap projections 16 by way of a transverse deflection of the tongues move laterally inwards past the steps forming the snap recesses 17, and after moving over these lock in outwards by way of the elastic return of the tongues 15 and thus hold the terminal box 12 on the motor housing 8.

The terminal box 12, seen in the direction of the rotation axis 13, has an essentially rectangular outer contour and in the corner regions, thus in the region of an imagined axial extension of the screws 11, is designed in a recessed manner, so that the screws 11 are accessible to a tool applied from the axial direction, even with a stuck-on terminal box 12. These corner recesses are indicated at 20.

With this shaping, horizontal edge regions 21 and vertical edge regions 22 of the terminal box 12 result with the represented vertical installation position (suction connection 2 and pressure connection 3 lie vertically over one another).

Figure 2:
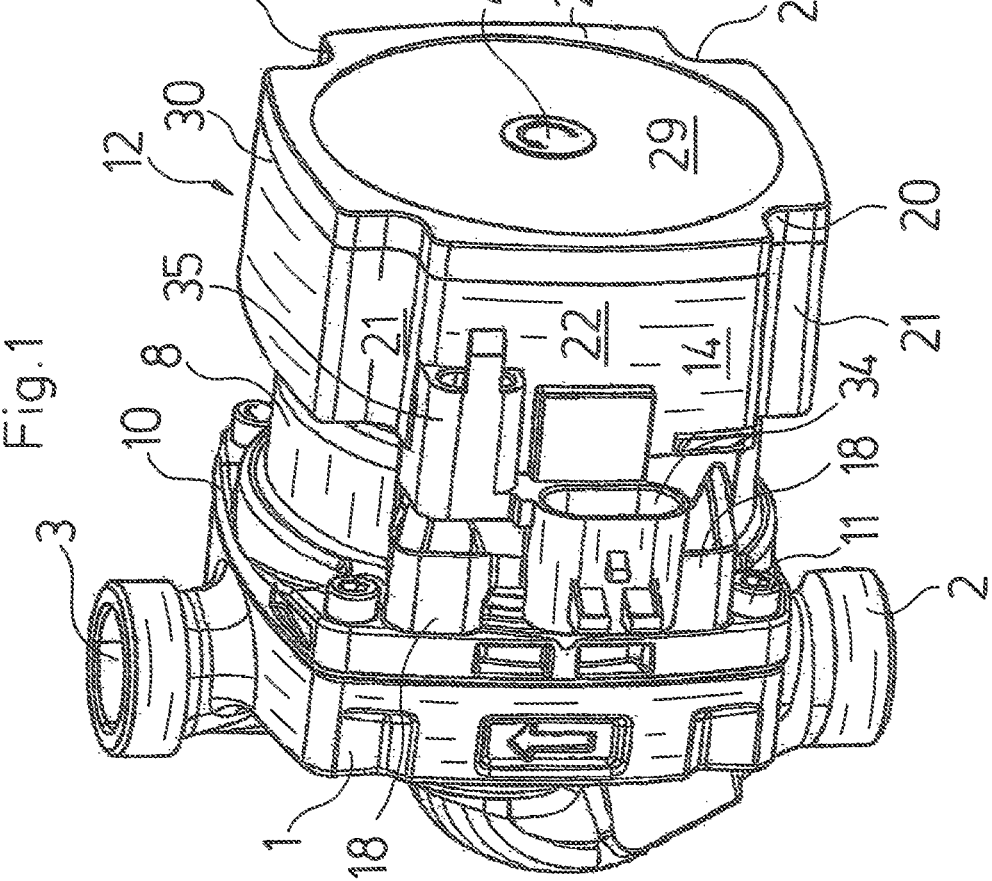
FIG. 2 is a terminal box with radial widenings in a representation according to FIG. 1.
Figure 3:
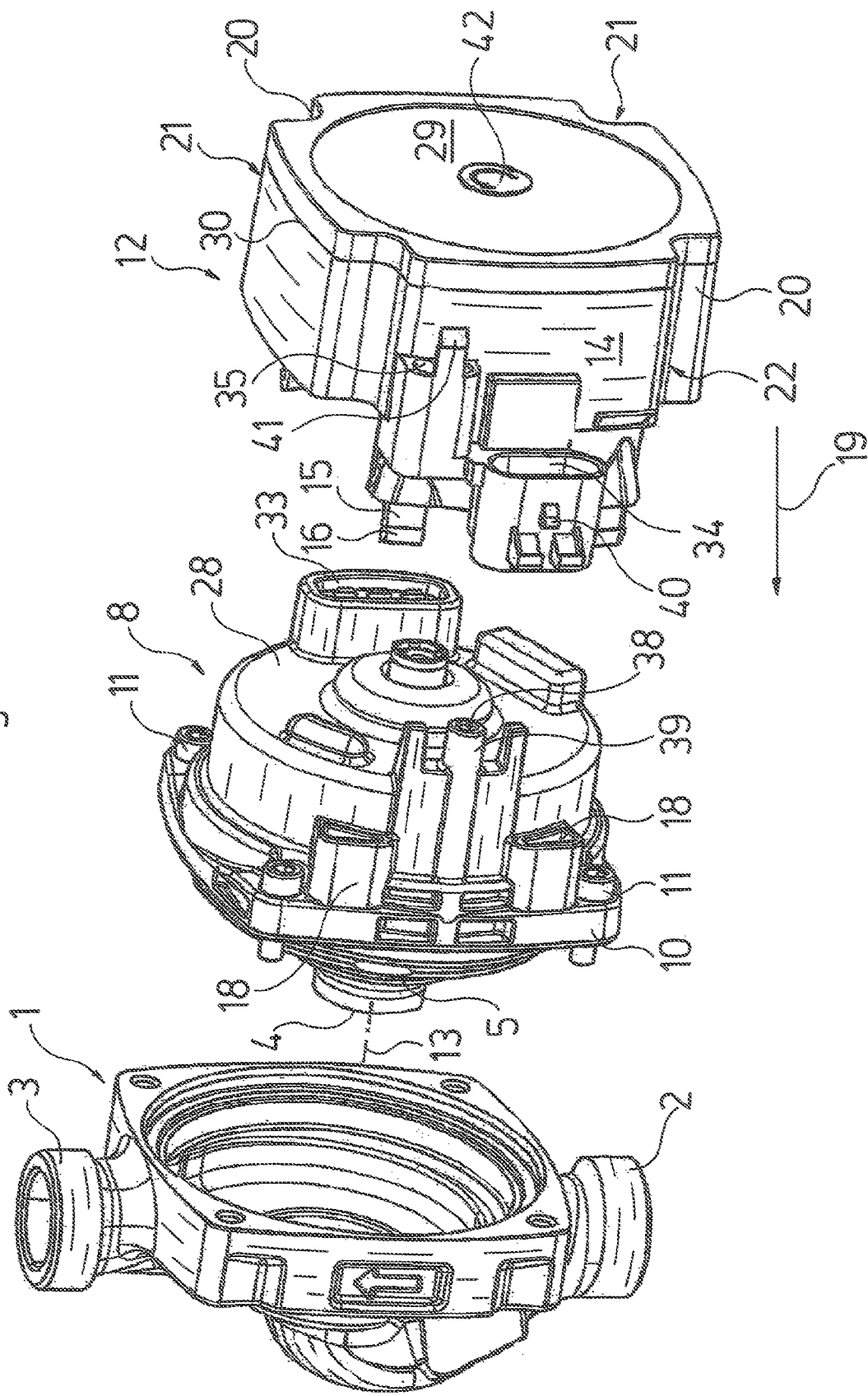
FIG. 3 is a perspective exploded representation showing the pump, motor and terminal box.

The vertical edge regions 22 with the shown embodiment are used for leading out electric contacts, whereas the horizontal edge regions 21 are used for the arrangement of electronic components within the terminal box. Since constructionally equal pumps can be designed with electric motors with different motor electronics, with the use of different terminal boxes which differ only in the radial extension of the horizontal edge regions 21, the inner volume of the terminal box, as is evident from a comparison of FIG. 1 and FIG. 2, can be varied without having to change the electrical connections here, and specifically neither on the motor side nor on the terminal box side. The extended horizontal edge regions in FIG. 2 are characterised at 21a, the terminal box at 12a.

Electrical contacts are arranged in the vertical edge regions 22, and specifically, seen in the axis direction from the terminal box 12 in the direction of the pump housing 1, the contacts 23 leading to the motor winding are arranged in the right vertical edge region 22 and the contacts 24 led out to a plug connection for the electrical connection of the motor are arranged in the left vertical edge region 22. These contacts 23 and 24 are to be recognised in the sectioned representation according to FIG. 6. They are each formed from sheet metal, thus as punched parts and in groups are designed equally, i.e. all contacts 23 are constructionally equal to one another as well as all contacts 24 constructionally equal amongst one another.

Figure 4:
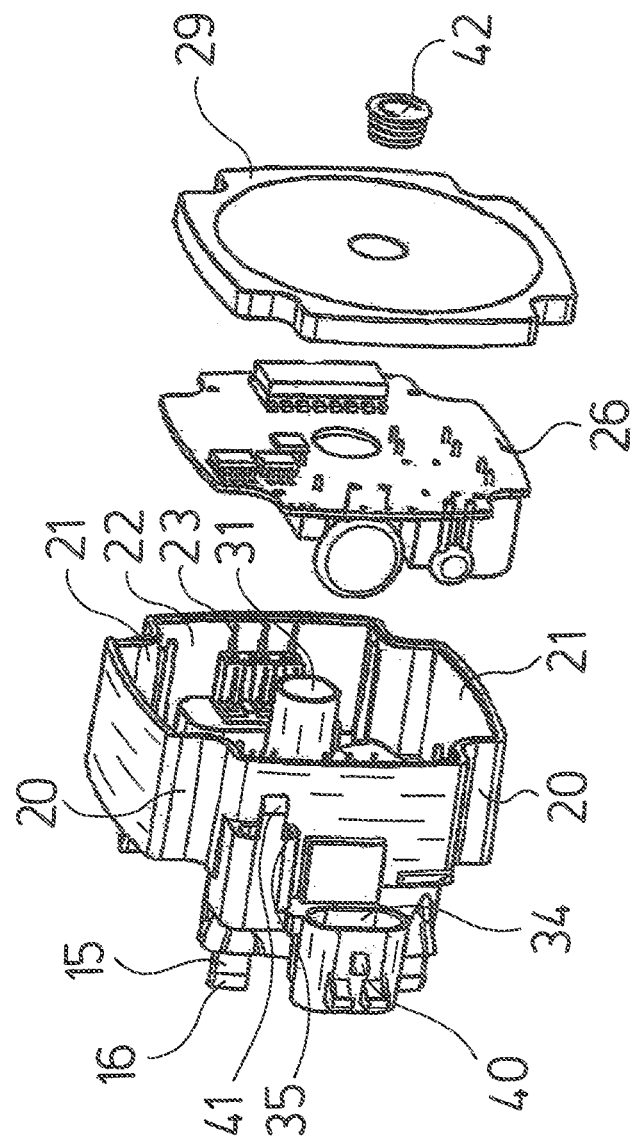
FIG. 4 is a perspective exploded representation, of the terminal box according to FIG. 3, with regard to its construction.
Figure 5:
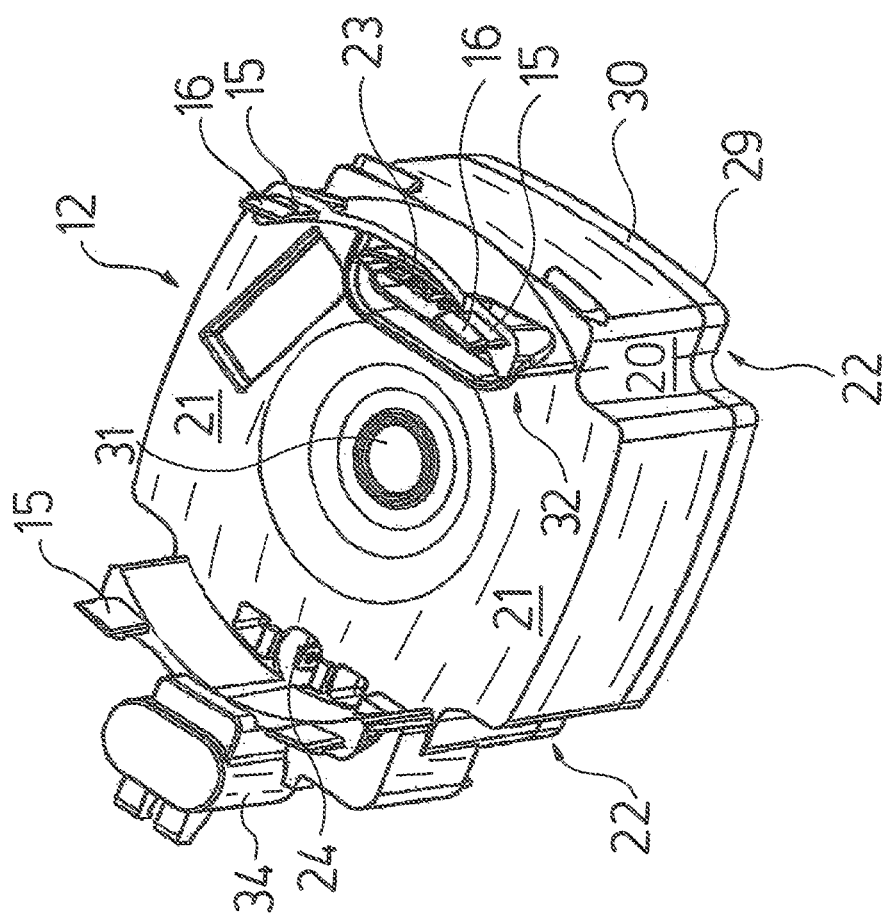
FIG. 5 is a perspective view of the terminal box from below.
Figure 6:
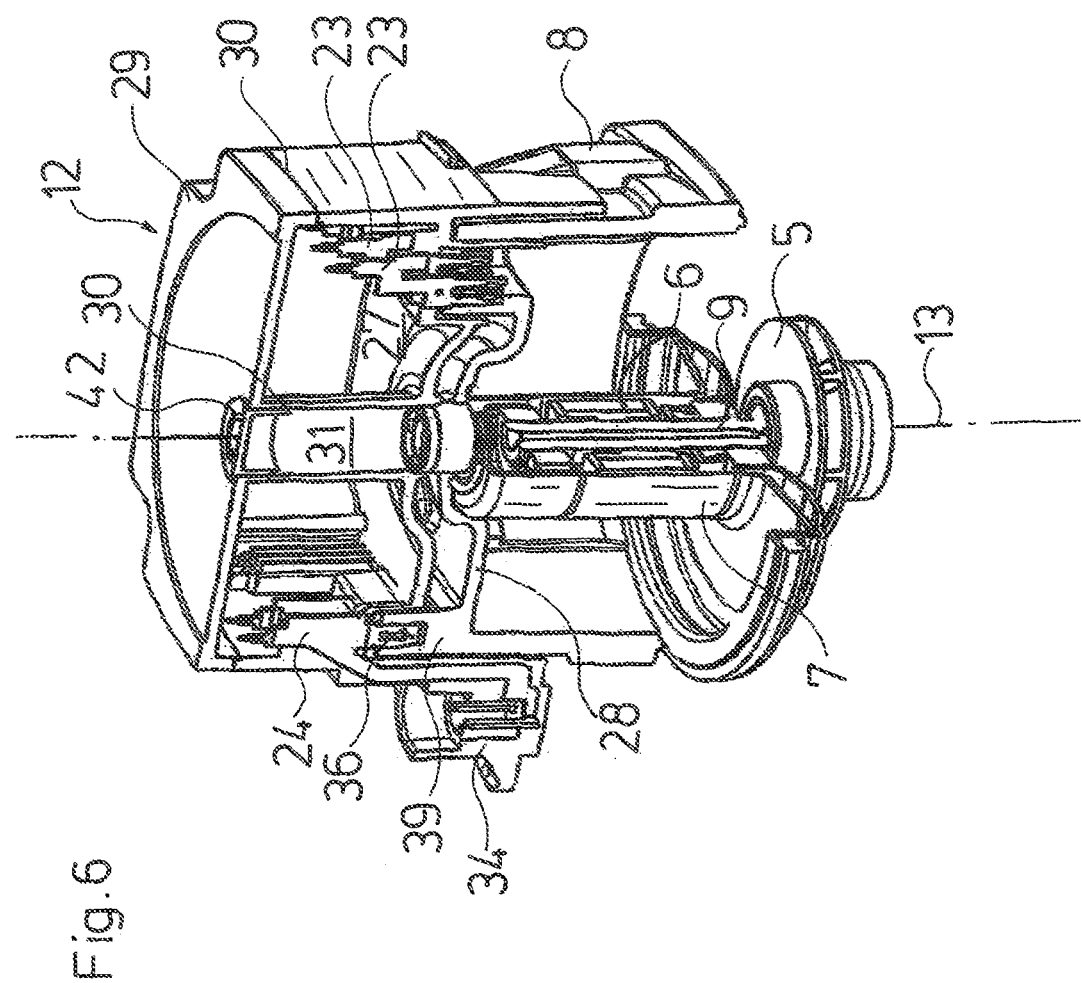
FIG. 6 is a perspective longitudinal sectioned representation of the terminal box and motor, with an applied pump impeller.

All contacts 23 and 24 as well as the further contacts 25 which are arranged on the left side in the vertical edge region 22 and which serve for the motor control, end in the terminal box 12 on a circuit board 26 which in the representation according to FIG. 6 is not represented for reasons of an improved overview, but is visible in the exploded representation according to FIG. 4 and which carries the electrical and electronic components of the motor control, here in particular a frequency converter.

The contacts 23, 24 and 25 are sealingly cast into the terminal box 12 which is formed from thermoplastic plastic, and specifically the contacts 23 into the base 27 of the terminal box 12 and the contacts 24 and 25 into the base 27 or the side wall 14 which is adjacent thereon.

The base 27 of the terminal box 12 is designed in a completely closed manner and is designed distanced to the axial wall 28 of the motor housing 8 (see FIG. 6). The base 27 merges into the likewise closed side walls 14 and the axial end of the side walls 14 is closed by a cover 29 which is likewise designed in a closed manner (closed with respect to the inside of the terminal box). The cover 29 is connected to the base body of the terminal box 12 consisting of the base 27 and walls 14, with a material fit by way of a peripheral welding seam 30. In this manner, the terminal box inside is not only closed in a sealed, but hermetic manner, i.e. the sensitive electronics located therein are reliably protected from the penetration of dust, water and gases.

The welding seam 30 is formed by laser welding from the cover side. For this, the cover 29 is manufactured form a material which lets through the laser beam, whereas the base body, thus the base 27 and the side walls 14 are manufactured from a material which is essentially impermeable to the laser beam. The welding is effected in a manner such that the laser beam is directed from the cover side onto the end-sides of the side walls 14 which face the cover. Thereby, the laser beam goes through the cover 29 which is transparent to the laser beams, up to the end-sides of the side walls 14 where it melts the material which due to the heat effect also melts with the cover material and in this manner forms a hermetic welding connection between the side walls 14 and the cover 29, by which means the terminal box 12 is hermetically closed to the outside. Thereby, the welding is not only effected in the region of the outer lying walls 14, but also in the region of the central recess 31, thus at a location which is otherwise poorly accessible to welding.

A central recess 31 passes through the terminal box 12, runs in the axial direction, is closed by a plug 42 and is not connected to the inside of the terminal box. This recess 31 leads to an opening in the axial wall 28 of the motor housing 8, said opening being likewise closed by a screw and via which the free end of the shaft 9 is accessible in order, given a blockage of the rotor 6, to be able to rotate this freely by hand. The screw closing this opening is designed as a type of grub screw with a hexagon socket, wherein the hexagon socket receiver is designed such that the screw remains on the tool on removal, so that when removing the plug 42 by way of a key, this screw can be removed and then the shaft 9 can be manually rotated by way of a further tool. The openings are then closed again in the reverse sequence. The recess 31 passes through the terminal box 12, thus in the axial direction, so that a hermetically closed annular space results in the terminal box 12.

Inasmuch as it concerns the contacts 23 which are provided for the connection to the motor winding, these are formed into the base of the terminal box 12, and specifically in the right vertical edge region 22, in the manner of a socket 32. A plug 33 on the axial wall 28 and projecting axially to the terminal box 12 is formed on the motor housing 8 and on placing the terminal box 12 onto the motor housing 8 is connected to the socket 32, via which the electrical connection between the terminal box 12 and the motor winding is created.

Figure 7:
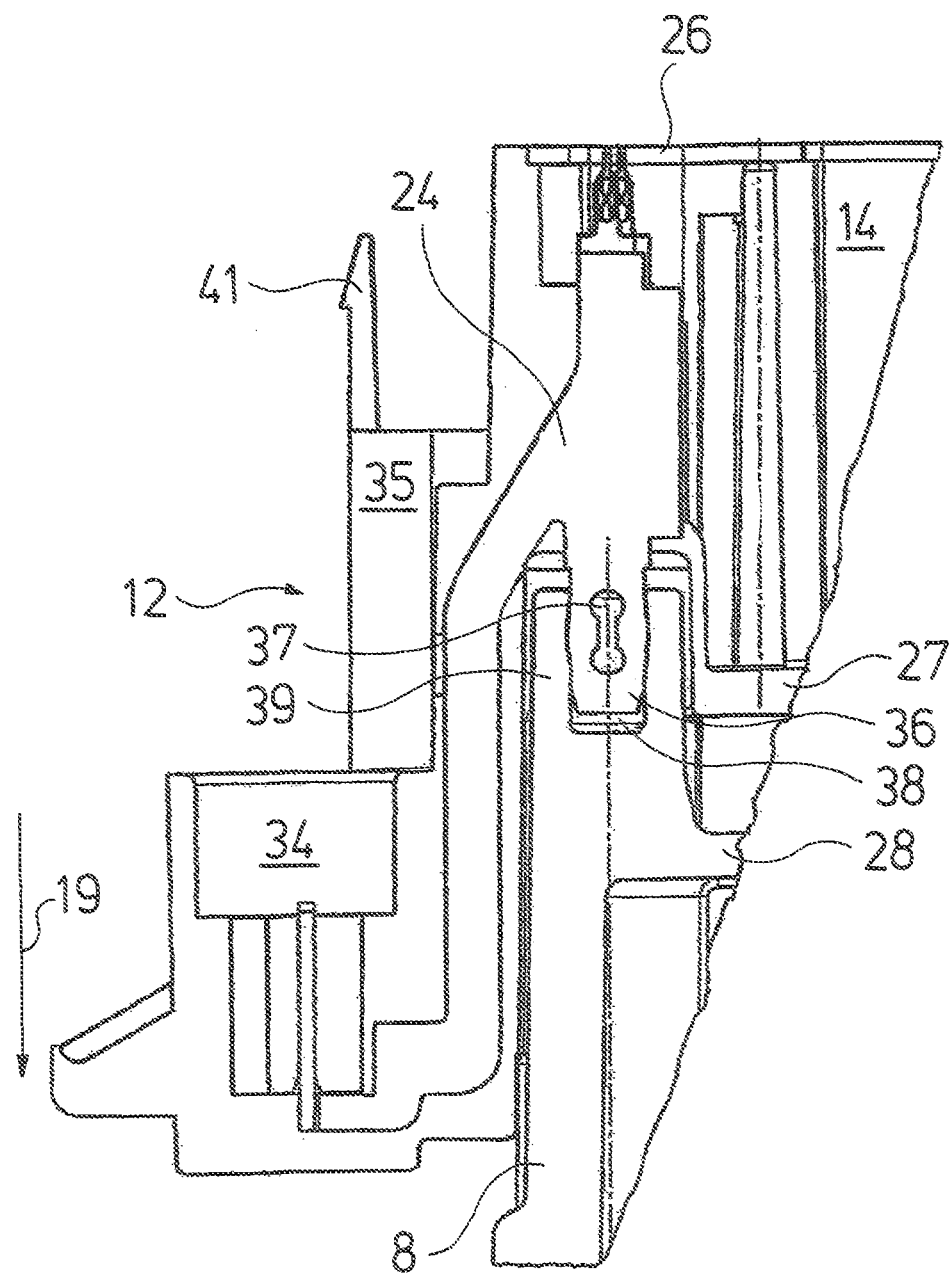
FIG. 7 is an enlarged representation of a longitudinal section in the region of the earth (ground) contact between the terminal box and motor.
Figure 8:
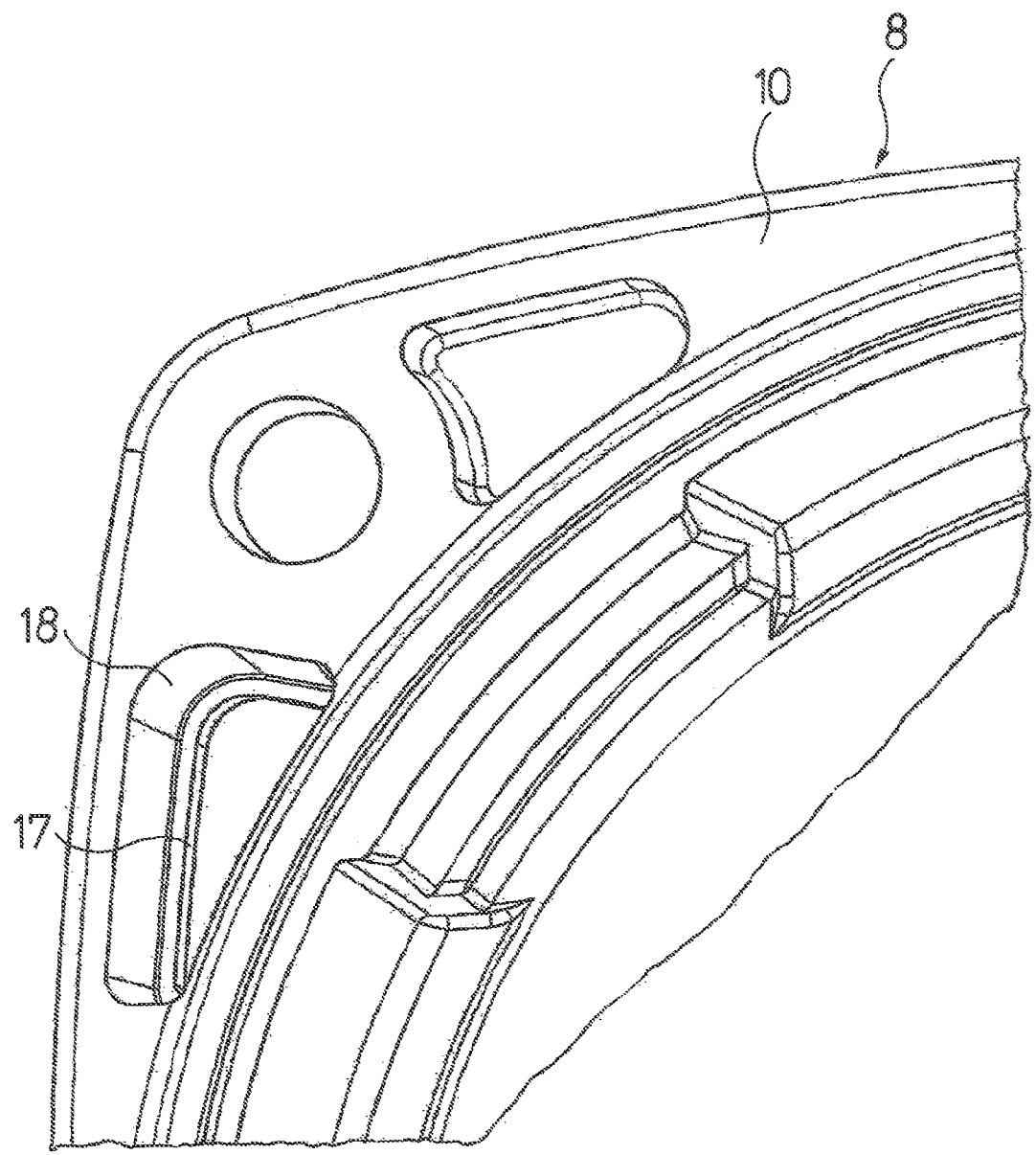
FIG. 8 is an enlarged representation of a view of the corner region of the motor housing flange from the pump side.

On the oppositely lying left side of the vertical edge section 22 of the terminal box 12, the contacts 24 with one leg are led out to a socket 34 and the contacts 25 to a socket 35. One of the contacts 24, specifically the contact represented in FIG. 7, is an earth contact and serves for connecting the metallic motor housing 8 to the corresponding earth connection of the socket 34 or to the respective earth connection on the circuit board 26 within the terminal box 12. For this, the contact 24 on one leg comprises an insert part 36 which in the sheet of the page has a slightly crowned or convex shape, as well as a central longitudinal recess 37 in the insert direction of the insert part 36. A socket-like recess 38 is provided in an axial prominence (projection, protuberance) 39 on the axial wall 28 of the motor housing 8, in a manner which is flush with the insert part 36 of the earth contact. The transverse dimension of the recess 38 is slightly smaller that the transverse extension of the insert part 36 in the crowned region, so that on inserting the insert part 36 into the recess 38, the insert part at least elastically, possible also plastically is deformed, by which means an intimate contact between the insert part 36 and recess 38 in the motor housing 8 and thus a reliable earthing (grounding) is ensured. The recess 37 is provided, so that the insert part 36 can also deform plastically as the case may be.

The non-earth contacts 24 which with regard to the shaping are formed identically to the earth contact, likewise comprise an insert part 36 with a recess 37, but are peripherally cast with plastic in the region of the insert part 36, and here a free space is on the motor side, since the prominences 39 are provided quasi in a point like manner only in the region of the insert part 36 of the earth contact.

The contacts 24 and thus in particular also the earth contact which has an intimate connection to the motor housing 8, in the base 27 or in the side wall 14 is designed branched into two legs (see FIG. 7) and runs obliquely out of the terminal box to the pump housing 1, parallel along the outer periphery of the motor housing 8, but however ends at a distance in front of the flange 10 of the motor and is angled by 180° where the contacts 24 together form the socket 34 which serves for receiving a connection plug at the end of a cable of an electrical supply lead. The housing of the socket 34 is formed as one piece with the terminal box 12. The socket 34 is arranged offset to the terminal box 12 next to the motor housing 8 on the outer periphery of this. A plug engaging into this socket 34, can be inserted in the axial direction and specifically in the direction of the pump housing 1, and then lies next to the terminal box 12, and specifically next to the left vertical edge region 22. The socket 34 comprise a snap projection 40 which is part of a snap connection whose other part is provided on the counterpart, thus on the plug.

The socket 35 which receives the contacts 25 is led out of the terminal box in a similar manner, but through the side wall 14. The socket 35 which is formed there, in the representation according to FIG. 3, at the left vertical edge region 22 bears on the outer periphery of the terminal box 12, but differently to the socket 34, is not arranged offset towards the motor housing 8, but lies directly next to the terminal box 12. There, the socket 35 comprises a snap projection 41 which secures the plug engaging into to this socket against release. The sockets 34 and 35, as with the socket 32, are manufactured as one piece with the terminal box 12 with the plastic injection molded method, thus by way of peripherally injecting the contacts 23, 24, 25 with the manufacture of the terminal box base body.

The sockets 34 and 35 are designed as flat sockets in a manner such that their contacts 24 and 25 respectively are located in each case next to one another in a plane arranged essentially parallel to the motor housing 8. By way of this arrangement, the radial construction space next to the motor housing 8 or terminal box 12 is comparatively small.

If the motor housing is not designed as a metallic cast housing, but as a plastic housing or as a cast mass surrounding the stator, then the recess 38 in the prominence of the motor housing is provided with a contact, for example formed by a hollow-cylindrical metallic socket which is electrically conductively connected to the stator iron core and the metallic can 7, in order to ensure the electrical safely of the heating circulation pump, in the case that one of these components becomes live due to a stator defect.

While specific embodiments of the invention have been shown and described in detail to illustrate the application of the principles of the invention, it will be understood that the invention may be embodied otherwise without departing from such principles.

The invention claimed is:

1. A heating circulation pump comprising:
   a pump housing;
   a pump impeller arranged in the pump housing;
   a motor housing with a flange;
   an electric motor arranged in the motor housing, the pump impeller being driven by the electric motor and the motor housing being axially flanged onto the pump housing;
   screws fastening the flange of the motor housing on the pump housing; and
   a terminal box which connects axially onto the motor housing, for receiving electrical and/or electronic components for the motor control and for the electrical connection of the motor, wherein the terminal box at least in sections projects radially beyond the motor housing which is on the terminal box side, and the terminal box has an outer contour which is rectangular in an axial direction and said terminal box has recesses in corner regions, said recesses being arranged in a region of an axial extension of the screws, wherein the terminal box, in a terminal box region projecting radially beyond the motor housing, comprises a fastening means, with which the terminal box is fastened on the motor housing, the fastening means comprising snap connections which engage over the motor housing in a radial and an axial manner, wherein flange recesses are provided in a region of the flange of the motor housing, into which snap projections engage, said snap projections being arranged on tongues which extend from the radially protruding parts of the terminal box in the axial direction along the motor housing and are integrally formed on the terminal box on the sides of contact feed-throughs.

2. A heating circulation pump according to claim 1, wherein flange recesses are provided on the flange of the motor housing, into which snap projections engage.

3. A heating circulation pump according to claim 2, wherein the contacts to a motor winding on the one hand and the contacts for the electrical connection one the other hand are arranged on two oppositely lying sides in an edge region of the terminal box, and that the terminal box on at least one side, which is offset by 90° to the oppositely lying sides, projects radially further beyond the motor housing than at the oppositely lying sides.

4. A heating circulation pump according to claim 2, wherein contacts which are led through the terminal box wall are cast in and in a terminal box end at a circuit board.

5. A heating circulation pump according to claim 4, wherein the contacts for the electrical connection are designed as a plug or socket of a plug connection, and the plug or the socket forms part of the terminal box housing and is arranged axially offset to the terminal box and adjacent to the motor housing.

6. A heating circulation pump according to claim 2, wherein the motor is a wet-running motor and a terminal box base is arranged distanced to the motor housing.

7. A heating circulation pump according to claim 2, wherein the terminal box comprises an axial, central feed-through to the rotor space, said feed through being accessible from the outside.

8. A heating circulation pump according to claim 2, wherein the motor comprises a three-phase d.c. motor with six windings.

9. A heating circulation pump according to claim 2, wherein the motor housing, in region between the motor flange and the terminal box, has a circular basic contour in the axial direction.

10. A heating circulation pump according to claim 2, wherein said motor housing comprises a motor housing interior space, said terminal box comprising a terminal box interior space, each of said snap connections being located at a position outside of said motor housing interior space and said terminal box interior space.

11. A heating circulation pump according to claim 10, wherein said flange recesses are located outside of said motor housing interior space and said terminal box interior space.

12. A heating circulation pump according to claim 2, wherein said flange recesses and at least a portion of each of said snap projections are external to an outer peripheral surface of said motor housing.

13. A heating circulation pump according to claim 2, wherein said flange comprises a plurality of screw receiving recesses, each of said flange recesses being located adjacent to one of said screw receiving recesses.

14. A heating circulation pump comprising:
a pump housing;
a pump impeller arranged in the pump housing;
a motor housing comprising a flange and a motor housing interior space;
an electric motor arranged in the motor housing, the pump impeller being driven by the electric motor;
screws fastening the flange of the motor housing to the pump housing, said flange comprising a plurality of flange recesses and snap projection receiving recesses, said plurality of flange recesses and snap projection receiving recesses being provided on the flange; and
a terminal box which connects axially onto the motor housing, for receiving electrical and/or electronic components for the motor control and for the electrical connection of the motor, and the terminal box has an outer contour which is rectangular in an axial direction and the terminal box has terminal box recesses in corner regions thereof, said terminal box comprising a terminal box interior space, each of said terminal box recesses being aligned with one of said flange recesses, said terminal box comprising a plurality of snap projections in a terminal box region projecting radially beyond the motor housing, each of said snap projection receiving recesses receiving at least a portion of one of said snap projections, whereby said terminal box is connected to said motor housing, wherein said snap projections and said snap receiving recesses are located external to said terminal box interior space and said motor housing interior space, wherein each of said flange recesses is arranged adjacent to one of said snap projection receiving recesses, said snap projections being arranged on tongues which extend from the radially protruding parts of the terminal box in the axial direction along the motor housing and are integrally formed on the terminal box on the sides of contact feed-throughs.

15. A heating circulation pump according to claim 14, wherein said snap projections extend over an outer surface of the motor housing in a radial and an axial manner, each of said flange recesses receiving at least a portion of one of said screws.

16. A heating circulation pump according to claim 15, wherein said tongues extend beyond an outer surface of the terminal box, wherein said radially protruding parts are located at a first radial distance from a longitudinal axis of said terminal box and said outer surface is located at a second radial distance from said longitudinal axis, said first radial distance being greater than said second radial distance.

17. A heating circulation pump according to claim 16, wherein said flange recesses and at least a portion of each of said snap projections are located external to an outer peripheral surface of said motor housing.

18. A heating circulation pump comprising:
a pump housing;
a pump impeller arranged in the pump housing;
a motor housing comprising a flange;
an electric motor arranged in the motor housing, the pump impeller being driven by the electric motor;
screws fastening the flange of the motor housing to the pump housing, said flange comprising a plurality of flange recesses and a plurality of snap projection receiving recesses, each of said snap projection receiving recesses being arranged adjacent to an outer periphery of said motor housing, said snap projection receiving recesses being arranged on said flange; and a terminal box which connects axially onto the motor housing, for receiving electrical and/or electronic components for the motor control and for the electrical connection of the motor, and the terminal box has an outer contour which is rectangular in an axial direction and the terminal box has terminal box recesses in corner regions thereof, each of said terminal box recesses being aligned with one of said flange recesses, said terminal box comprising a plurality of snap projections in a terminal box region projecting radially beyond the motor housing, each of said snap projection receiving recesses receiving at least a portion of one of said snap projections, whereby said terminal box is connected to said motor housing, wherein each of said flange recesses is adjacent to one of said snap projection receiving recesses, said snap projections comprising tongues which extend from radially protruding parts of the terminal box in the axial direction along the motor housing and are integrally formed on the terminal box on the sides of contact feed-throughs.

19. A heating circulation pump according to claim 18, wherein said motor housing comprises a motor housing interior space, said terminal box comprising a terminal box interior space, wherein said snap projections and said snap receiving recesses are located external to said terminal box interior space and said motor housing interior space, wherein said snap projections extend over an outer surface of the motor housing in a radial and an axial manner.

20. A heating circulation pump according to claim 19, wherein said radially protruding parts beyond an outer surface of the terminal box, wherein said radially protruding parts are located at a first radial distance from a longitudinal axis of said terminal box and said outer surface is located at a second radial distance from said longitudinal axis, said first radial distance being greater than said second radial distance, said flange recesses being arranged about an outer peripheral surface of said motor housing.

* * * * *